Figure 1:
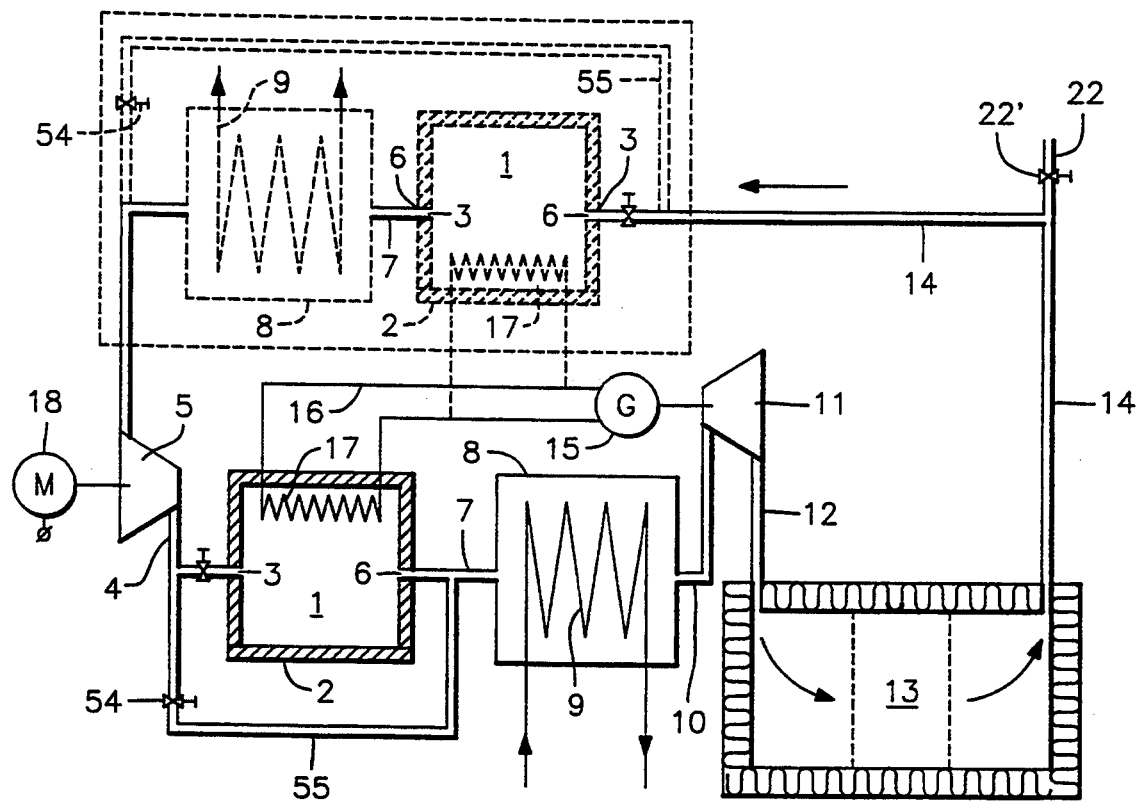

United States Patent [19]

Almlof et al.

[11] Patent Number: 5,379,988
[45] Date of Patent: Jan. 10, 1995

[54] PLANT FOR EXTRACTING SUBSTANCES IN GAS OR MIST FORM FROM A FLOW OF GAS

[75] Inventors: Göran Almlof, Malung; Folke Lilliehöök, Skanör, both of Sweden

[73] Assignee: Bal AB, Malung, Sweden

[21] Appl. No.: 94,010

[22] Filed: Jul. 23, 1993

[30] Foreign Application Priority Data

Feb. 1, 1991 [SE] Sweden .................. 9100324

[51] Int. Cl.6 .............................................. C22B 7/00
[52] U.S. Cl. .................................. 266/206; 75/590; 75/595; 75/669; 75/670
[58] Field of Search ............. 75/590, 595, 669, 670; 266/206

[56] References Cited

U.S. PATENT DOCUMENTS 4,334,918 6/1982 Warner .................................. 75/696

FOREIGN PATENT DOCUMENTS 3609517 11/1987 Germany .
451464 10/1987 Sweden .
1164069 9/1969 United Kingdom .
1526148 9/1978 United Kingdom .

Primary Examiner—Peter D. Rosenberg
Attorney, Agent, or Firm—Jacobson, Price, Holman & Stern

[57] ABSTRACT

A plant for separating substances from a gas flow, especially environmentally harmful heavy metals in gas form released in connection with incinerating batteries, the plant including in series connection in a gas flow circuit, a chamber for initially collecting the gas flow containing the substances to be separated; a compressor which pressurizes the gas flow; an expansion device through which the pressurized gas flow passes while rapidly lowering the pressure and temperature of the gas flow so that at least a part of the substances to be separated condense and are separated in solid or fluid state in a separation chamber, the inlet of which is connected to the outlet of the expansion device and which is provided with an outlet for the remaining gas flow which communicates with the inlet of the collecting chamber to form a closed gas-circulation circuit.

6 Claims, 2 Drawing Sheets

PLANT FOR EXTRACTING SUBSTANCES IN GAS OR MIST FORM FROM A FLOW OF GAS

The present invention relates to a plant of the kind defined in the preamble of the following Claim 1 for extracting substances in gas or mist form from a flow of gas.

A number of more or less primitive plants of this kind are known to the art. These known plant, however, are unable to cleanse waste gases effectively and often leave solid residues which cannot be dumped or deposited without first being further processed or treated.

The aversion of the general public to plants of this kind, such as waste incinerators or plants for the destruction of environmentally harmful waste materials situated in the vicinity of built-up areas, can be easily understood. Due to the risk of environmentally harmful material being spread over long distances from such plant, either by air or by water, it is difficult to obtain permission to construct such plants, and environmentally harmful material, such as mercury batteries and other scrapped articles containing heavy metals among other things, such as mercury, are at present stored in barrels in far from satisfactory conditions and forms.

There is therefore a need to provide improved plants which are able to achieve desired separation, e.g. destruction, without contaminating the surroundings with environmentally harmful substances, as is the case at present.

A step in the right direction has been taken in the case of a proposed plant in which environmentally harmful waste is charged to a furnace in which the waste is heated to a temperature of from 400°-600° C. under vacuum. Mercury and organic materials are vaporized and led to an afterburner to which oxygen is supplied and in which the vaporized organic material is combusted at a temperature of about 850° C., resulting in the formation of carbon dioxide and steam. The gases are then cooled and the majority of the mercury present is condensed in a condenser at a temperature of about 15° C. Finer extraction of mercury from the waste gases is achieved by drawing the waste gases through an active carbon filter and a freeze chamber, temperature $-20°$ C., with the aid of a suction pump, whereafter the waste gases are discharged through a chimney to atmosphere. According to calculations, these flue gases contain at most 0.13 mg of mercury per $m^3$ of gas, together with carbon dioxide among other substances. A single run of the plant takes from 12-15 hours to complete and involves the destruction of one barrel filled with mercury batteries and other environmental harmful materials. The process includes the addition of nitrogen gas and oxygen and the control of temperature and subpressure, and is intended to be controlled fully automatically by means of a microprocessor, in dependence on the type of waste concerned. The scrap remaining in the barrel is intended to contain at most 75 ppm mercury and shall be capable of being dumped or deposited safely. The process is thus quite complicated and there is a risk of serious consequences to the surroundings in the event of a malfunction.

The object of the present invention is to provide a novel plant of the kind defined in the introduction which is less liable to subject the surroundings to pollution.

This object is achieved in accordance with the invention with a plant having the characteristic features set forth in the characterizing clause of the following Claim 1. The extraction or destruction process is thus carried out in an essentially fully enclosed system and comprises circulating a gas flow, alternately heating and contaminating the gas flow with, e.g., said environmentally harmful waste, and thereafter cooling the gas pronouncedly to a temperature which is so low as to condense the environmentally harmful substances and separate these substances from the gas flow. The gas is circulated until the concentration of environmentally harmful substances has fallen to an acceptable level. The results of tests carried out on the inventive plant have shown the residual concentration of mercury for instance to be as low as 0.2 micrograms for each normal cubic meter of gas at a temperature of $-60°$ C.

The process can be continued for the length of time required to achieve the degree of extraction or separation desired, since the temperature of the gas can be lowered readily to a temperature of $-100°$ C. for instance, in the expansion device, wherewith carbon dioxide and oxides of nitrogen are also condensed, therewith leaving solely a volume of inert gas upon completion of the process. The process time is from 0.2-0.5 h for a volume of about 200 liters (=1 oil barrel).

Figure 2:
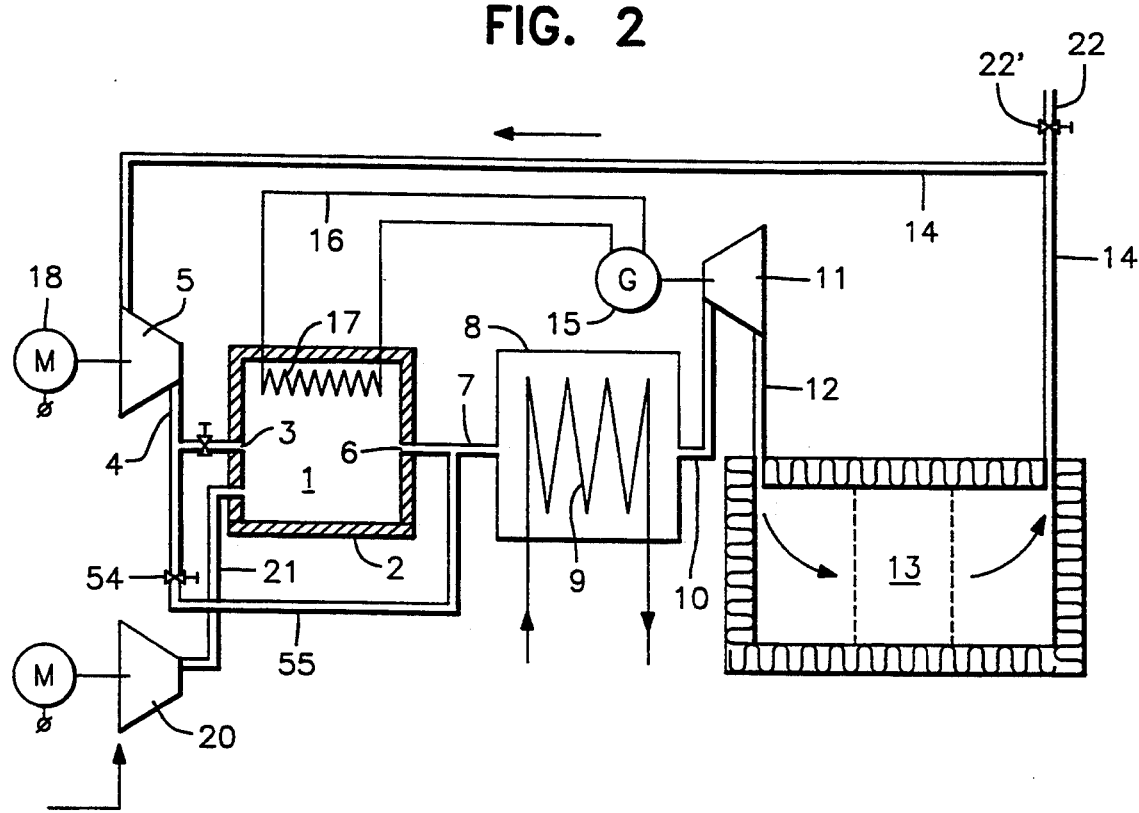
Figure 3:
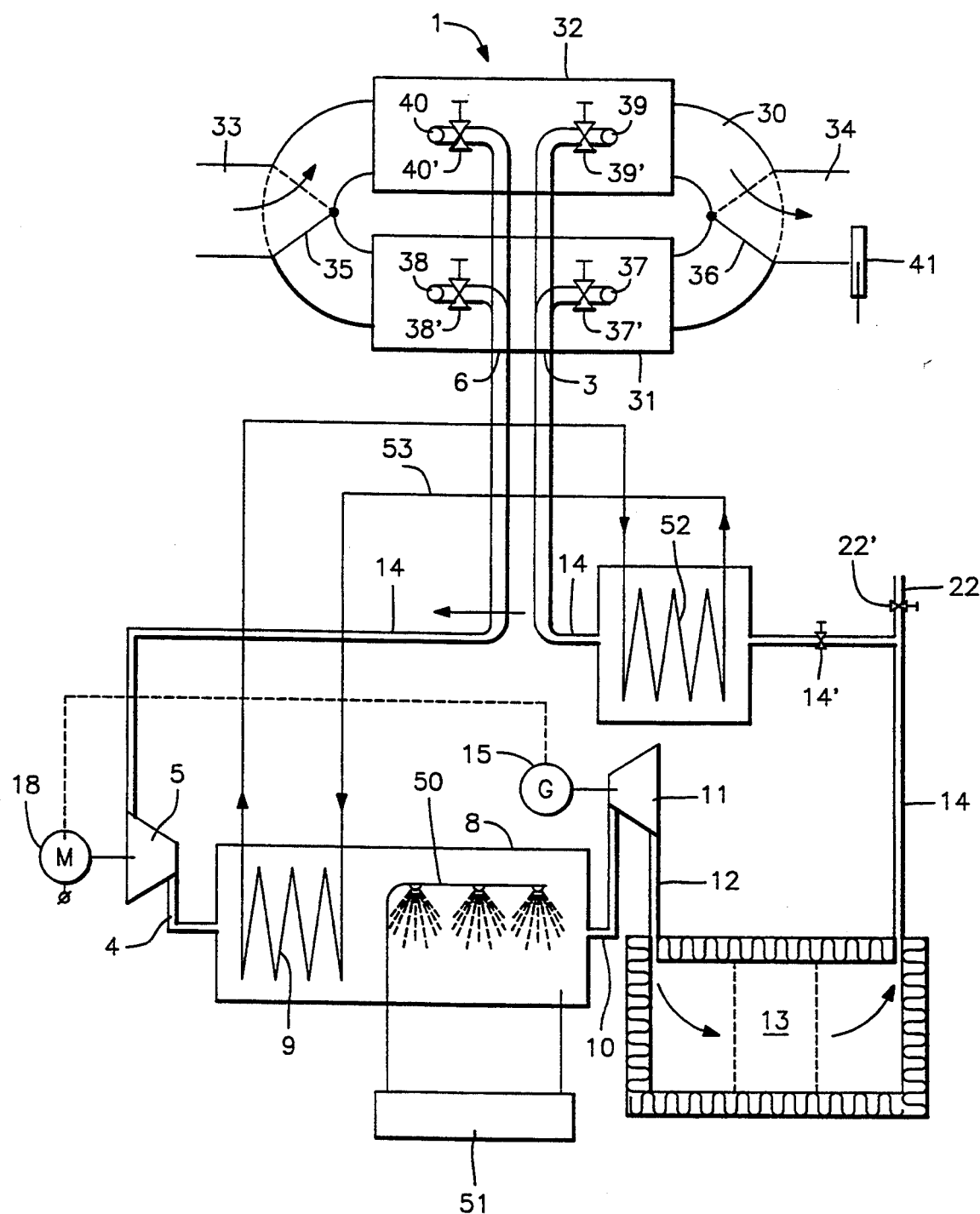

The invention will now be described in more detail with reference to exemplifying embodiments thereof and with reference to the accompanying drawings, in which FIGS. 1 and 2 illustrate schematically respective exemplifying embodiments of the inventive plant, comprising a collecting chamber in the form of a furnace; and FIG. 3 illustrates schematically a corresponding plant comprising a collecting chamber which includes adsorption chambers and through which a solvent-containing gas flows.

The plant illustrated in FIG. 1 includes a furnace 1 having an openable bottom 2. The furnace 1 further includes inlet opening 3, which is connected to the outlet of a compressor 5 by means of a pipe 4, and an outlet opening 6, which is connected by a pipe 7 to a cooler 8 comprising a cooling coil 9 which is supplied with a suitable coolant. Cooling of the gas entering the cooler 8 may also be effected by spraying water into the gas. Connected to the cooler 8 is a pipe 10 which extends to the inlet of a screw expander 11, the outlet of which is connected by a pipe 12 to an inlet opening of a filter chamber 13. The chamber 13 has an outlet opening which is connected by a pipe 14 to the inlet of the compressor 5, and to a valve 22', which is normally closed, through which any surplus gas can be released through a pipe 22. The furnace 1, followed by the cooler 8, may also be connected in the pipe 14, between the outlet of the filter chamber 13 and the compressor inlet, as indicated by the broken single-line rectangle in FIG. 1.

The furnace 1 is connected in parallel with a controllable bypass conduit 55, by means of a valve arrangement 54. This arrangement can have an important significance from the aspect of system control. For instance, the arrangement enables solely that amount of gas required to carry away the contaminants to be heated during plant operation. The compressor 5 and the expander 11 will constantly work with the same gas flow, while the flow of gas through the furnace 1 can be varied. The arrangement also provides the advantage of enabling the oxygen content of the furnace to be controlled, therewith enabling low-oxygen combustion to be achieved. The hydrocarbons produced are then unable to find a sufficient number of oxygen molecules and, as a consequence, form both carbon monoxide and free hydrogen. These components have a strongly reducing effect at high temperatures and therewith enable undesirable mercury compounds to be converted to purely metallic mercury which is easier to handle.

For the purpose of braking the rotors of the screw expander 11, an electric generator 15 is connected to the rotors which also functions to supply electricity to a heating coil 17 in the furnace 1, through an electric conductor 16. A motor 18 is connected to the compressor 5.

The plant operates in the following manner: An oil barrel having a volume of about 200 liters and filled with environmentally harmful material, e.g. mercury batteries, is placed in the furnace 1 and heated to a temperature of 400°–1800° C. by means of heating coils (not shown) or some other appropriate means. The compressor 5 is started-up by the motor 18, so as to pressurize the furnace 1 and the cooler 8.

As a result of pressurizing the furnace and cooler, the screw expander 11 begins to rotate and is braked by the generator 15, which contributes towards heating of the furnace 1, through the electrical conductor 16 and the heating coil 17. A pronounced drop in pressure occurs over the screw expander 11, therewith pronounced cooling of the gas leaving the expander 11. When the temperature of the gas is lowered in the cooler 8 by means of the cooling device 9 to a temperature below 40° C., the gas in the chamber 13 may be given a temperature of from $-50°$ to $-100°$ C., wherewith mercury, among others, condenses and can be collected and removed from the chamber 13, while recycling the cold gas through the pipe 14 to the furnace 1, via the compressor 5, in a closed circuit, wherewith mercury is progressively expelled from the material present in the furnace until essentially no mercury remains therein. Different substances carried by the gas flow can be extracted individually therefrom, by lowering the temperature of the gas in several stages with the aid of multi-stage expansions, optionally in combination with heat exchange.

It is necessary to introduce fresh material into the plant and to discharge residues, slag and ash from said plant through gas-tight locks or valve mechanisms, so as to ensure that contaminated gas will not escape to atmosphere.

When opening the furnace for the introduction of fresh material, the gas present in the compressor 5 is preferably led immediately therefrom to the cooler 8 through the pipe 55, so as to maintain cooling of the chamber 13.

The embodiment illustrated in FIG. 2 is generally similar to the embodiment illustrated in FIG. 1, with the exception of a further compressor 20 which is intended to supply air of combustion to the furnace 1 through a pipe 1 for the combustion of hydrocarbons, which are gasified in the furnace at higher temperatures. Although not shown, a pilot flame is kept burning in the furnace during the process. The FIG. 2 embodiment also includes a discharge pipe 22 to which there is fitted a valve 22' which functions to release surplus gas from the return pipe 14 forming part of the closed circuit. The flow through the compressor 20 is only a small part of the flow through the compressor 5.

The invention can be applied within many different branches of industry where environmentally harmful solvents are used for painting and washing processes, and also in the manufacture of plastic articles, gluing processes, in printing plants, or in industries of other chemical activities. Such chemicals include thinners, toluene, styrene, trichloroethylene, petrochemicals, alcohols, acetone, benzene, etc. A common factor of all such chemicals is that they include different types of volatile hydrocarbons, although theoretically the invention can also be applied with other volatile substances, provided that a suitable adsorbent can be found. It is earlier known that these substances can be adsorbed in filter plants with the aid of an adsorbent, e.g. an active carbon or so-called Zealites. The carbon is then incinerated or, in the case of large plants, the carbon/adsorbent is regenerated. This regeneration is effected with the aid of heat or superheated steam. The steam is led into a condenser, where the solvent also condenses. The majority of hydrocarbons, although not alcohols, are not easily dissolved in water. The mixture can therefore be left to stand and the solvent fraction later removed and, normally, reused.

Regeneration is an expensive process which places particular demands on the filter plant and on the carbon used. Thus, in practice, the purifying efficiency of the system is lower than that which can be theoretically achieved with the adsorbent used.

This process is simplified considerably by the inventive plant for cleaning crude gas illustrated in FIG. 3 and with the process employed in this plant. Smaller plants which provide a considerably improved degree of separation or extraction can be constructed.

The plant illustrated in FIG. 3 is principly similar to the plant illustrated in FIG. 2, although with the exception that a collecting chamber 1 which corresponds to the furnace 1 of the earlier embodiment is now located in the return pipe 14, and the generator 15 has been arranged to supply electrical energy to the motor 18.

The collecting chamber 1 in FIG. 3 is comprised of a tubular pressure vessel 30 which includes two mutually separate columns 31, 32 filled with an appropriate adsorption material, e.g. active carbon. The pressure vessel 1 is connected at one end thereof to a pipe 33 through which solvent-containing crude gas is delivered to the vessel, whereas the other end of the vessel is connected to a discharge pipe 34 for cleansed gas, these connections being achieved through the medium of two valves 35 and 36 which are intended to connect the columns 31, 32 alternately to the pipes 33, 34 so that when gas flows through one column, e.g. column 32, the other column, e.g. 31, is fully closed, with the exception of a respective valve-fitted inlet and outlet 37, 38 connected to the pipe 14. A corresponding inlet and outlet in the column 32 are referenced 39, 40 respectively. Associated valves are identified by the same reference numerals to which a prime sign has been added, i.e. 37', 38', 39' and 40'.

With the valves 35 and 36 are in the operational states illustrated in FIG. 3, the adsorbent material in the column 31 has been saturated with a solvent from a passing crude-gas flow during a proceeding working phase. This solvent is now vaporized and is discharged by opening the valve 38' and placing the outlet 38 in communication with the suction side of the compressor 5. At the same time, gas flows through the column 32 from the pipe 33. By allowing a given volume of gas to flow, by opening the valve 37', it is possible to drive-off the last residues of solvent without needing to generate a high subpressure. The column 31 may also be heated slightly, in order to accelerate vaporization of the solvent. There is a risk that certain substances, e.g. styrene, will polymerize at excessively high temperatures, therewith destroying the adsorbent material. This can be prevented by passing cold, cleansed gas into the column, from the separation chamber 14 (not shown).

When the adsorbent in the column 32 becomes saturated with solvent, a condition which can be detected by means of a sensor 41 mounted at the outlet from respective columns 31, 32, the valves 35, 36 are reversed so that gas will flow from the pipe 33 into the column 31 and out through the pipe 34, wherewith solvent that accompanies the gas will be re-adsorbed in this column. The valves 37' and 38' are closed at the same time, and the valves 39' and 40' opened, the valves 39' and 40' being set to a setting at which a desired subpressure is obtained in the column 32 with a suitable throughflow of gas, determined by the valve 39'.

In this way, the solvents are collected alternately in the two columns 31, 32 of the pressure vessel 30, these columns, in turn, being connected alternately to the pipe 14. The pipe 14, with the aid of the valves 37' and 39' and a control valve 14' connected in the pipe 14, is maintained at a subpressure suitable for expelling the solvents in the columns 31, 32 during circulation of the gas in the circuit which includes the pipe 14 and the compressor 5, the cooler 8, the expander 11 and the separation chamber 13, therewith achieving continuous extraction of the solvents in the chamber 13, in the manner aforedescribed.

The majority of solvents are explosive, which prohibits working at excessively high concentrations. A typical concentration limit is 10 $g/m^3n$, which applies to toluene, thinner, styrene and other similar substances. In order to ensure that these solvents are present in low concentrations, cleansed gas is recycled back to the column while the compressor applies suction at the other end at the same time. In the case of larger plants, the concentration limit may be raised from 3 to 5 times, by excluding oxygen from the flow of gas to the compressor. Extraction of oxygen from the gas flow can be achieved by filling the column with $CO_2$, $N_2$ or some other inert gas, prior to compressor suction beginning. The return gas will also be oxygen-free.

Subsequent to the gas having passed through the compressor 5, the gas is cooled in the cooler 8, which in the illustrated case is a pressurized heat exchanger. The pressure in the heat exchanger may be from 5–20 bars. The gas is further cooled by expanding the gas through a turbine or some other expansion machine 11, while generating mechanical force at the same time. The cooling effect is very pronounced and temperatures in the range of −50° to −90° C. can be achieved without difficulty. The solvent will then condense and can be subsequently readily separated in the chamber 13 and recovered. Only an insignificant amount of water is present and the residual content in the adsorbent is very low. The difference in the flow between the compressor 5 and the flow of crude gas in the chamber 13 may have almost any desired value, which is highly advantageous in practice.

It may often be necessary to heat the gas departing from the separation chamber 13 to the collecting chamber 1. This can be achieved readily with the aid of a heating coil 52 in the pipe 14, hot water being passed through a pipe 53 from the cooling device 9.

It will be understood that the invention is not restricted to the illustrated and described embodiments and that modifications can be made within the scope of the invention claimed. For example, the cooler 8 in which a number of substances condense may advantageously have the form of a scrubber 50 for intensified cooling of the gas and the device 51 for cleansing and removing condensation from the cooler 8.

The plant may also, of course, include more columns than the two illustrated columns 31 and 32.

We claim:

1. A plant for separating substances in a gas or mist form from a gas flow, especially such substances as mercury and other environmentally harmful heavy metals released when incinerating batteries or consumed solvents or other volatile substances released from chemical and metallurgical processes, said plant comprising in a series connection
a chamber for initially collecting the gas flow containing the substances to be separated;
a heat exchanger which is connected to an outlet of said chamber and which functions to lower the temperature of the gas flow;
a compressor which pressurizes the gas flow; and
an expansion device through which the gas flow passes while rapidly lowering the pressure and temperature of said gas so that at least a part of the substances to be separated condense and are separated in solid or fluid state in a separation chamber which is connected to the outlet of said expansion device and which is provided with an outlet for the remaining gas flow,
the outlet of the separation chamber being connected to a throttleable inlet of the collecting chamber such as to form a gas-circulation circuit, and being also connected to a throttleable residual gas outlet to atmosphere.

2. A plant according to claim 1, wherein the collecting chamber includes a furnace for melting and/or incinerating batteries or other materials which contain environmental harmful substances; and in that the furnace is connected in parallel to a controllable bypass conduit.

3. A plant according to claim 1, wherein the heat exchanger is combined with a cleansing and cooling scrubber-type cooling device by means of which the gas temperature at the inlet of the expansion device is restricted to about 30.C.

4. A plant according to claim 1, wherein the collecting chamber comprises a pressure vessel which includes chambers provided with adsorbent material and valves for guiding the gas alternately through the different chambers and connecting the chambers alternately to the suction side of the compressor and to the outlet of the separation chamber and creating a subpressure in respective chambers such as to vaporize the volatile substances adsorbed on the adsorbent material.

5. A plant according to claim 1, wherein the heat exchanger includes a scrubber provided with means for cleaning condensation removed from the heat exchanger.

6. A plant for separating substances in a gas or mist form from a gas flow, especially such substances as mercury and other environmentally harmful heavy metals released when incinerating batteries or consumed solvents or other volatile substances released from chemical and metallurgical processes, said plant comprising in a series connection
a chamber for initially collecting the gas flow containing the substances to be separated;

a heat exchanger which is connected to an outlet of said chamber and which functions to lower the temperature of the gas flow;

a compressor which pressurizes the gas flow; and an expansion device through which the gas flow passes while rapidly lowering the pressure and temperature of said gas so that at least a part of the substances to be separated condense and are separated in solid or fluid state in a separation chamber which is connected to the outlet of said expansion device and which is provided with an outlet for the remaining gas flow, the outlet of the separation chamber being connected to a throttleable inlet of the collecting chamber via the compressor such as to form a gas-circulation circuit, and being also connected to a throttleable residual gas outlet to atmosphere.

* * * * *